(12) United States Patent
Hsieh et al.

(10) Patent No.: US 8,143,807 B2
(45) Date of Patent: Mar. 27, 2012

(54) COLOR TEMPERATURE CONTROLLER AND COLOR TEMPERATURE CONTROL METHOD OF LIGHT EMITTING DIODE

(76) Inventors: Wan-Yu Hsieh, Taichung (TW);
Chi-Hsiang Wang, Taichung (TW)

( * ) Notice: Subject to any disclaimer, the term of this patent is extended or adjusted under 35 U.S.C. 154(b) by 409 days.

(21) Appl. No.: 12/542,668

(22) Filed: Aug. 17, 2009

(65) Prior Publication Data
US 2010/0052567 A1    Mar. 4, 2010

(51) Int. Cl.
*H05B 37/02* (2006.01)
(52) U.S. Cl. ............... 315/292; 315/308; 315/185 S
(58) Field of Classification Search ............... 315/185 S, 315/291, 292, 294, 297, 307–309
See application file for complete search history.

(56) References Cited

U.S. PATENT DOCUMENTS 7,781,979 B2 *    8/2010   Lys ........................... 315/185 S

* cited by examiner

*Primary Examiner* — Don Le

(57) ABSTRACT

This invention discloses a color temperature controller and a color temperature control method of a light emitting diode (LED). The color temperature controller applied in an LED lamp includes touch switches and a control element. After a color of a color pattern on any touch switch is clicked and selected by a user, a signal of the color is outputted to the control element, and the control element outputs a corresponding pulse width modulation (PWM) signal to control either the current or the voltage of a three-color LED in the LED lamp, so that the LED lamp produces a same color temperature change of the signal of the color to improve the color temperature control of a conventional LED lamp, and provides a flexible color change of the LED lamp.

10 Claims, 5 Drawing Sheets

COLOR TEMPERATURE CONTROLLER AND COLOR TEMPERATURE CONTROL METHOD OF LIGHT EMITTING DIODE

FIELD OF THE INVENTION

The present invention relates to a color temperature controller and a color temperature control method of a light emitting diode (LED), and more particularly to the color temperature controller having a color pattern respectively disposed on a plurality of touch switches (such as capacitance touch switches) and a control element for receiving signals of colors outputted from the touch switches, and outputting a corresponding pulse width modulation (PWM) signal according to the signals of the colors to control the current or the voltage of a three-color (RGB) LED in an LED lamp, so as to achieve the color temperature control of the LED lamp.

BACKGROUND OF THE INVENTION

Compared with traditional light source systems such as tubular fluorescent lamps (TFL) or high pressure sodium lamps (HPS), light emitting diode (LED) used for illumination comes with the advantages of high light-electricity conversion rate, small volume, long life, adopting DC current, fixed wavelength low heat generation, and complying with environmental protection requirements. Thus, the light emitting diode has become the most popular illumination device.

However, the function of most conventional LED lamps can adjust brightness only, so that the LED lamps can have a change of brightness, but seldom can adjust color temperature to have a flexible color change. Therefore, the LED lamps are deficient for the applications of decorations, environmental layouts, atmosphere creations and passionate expressions.

In view of the deficient color temperature control of the conventional LED lamp, the inventor of the present invention based on years of experience in the related field to conduct extensive researches and experiments, and finally developed a color temperature controller and a color temperature control method of light emitting diode in accordance with the present invention to overcome the shortcomings of the prior art.

SUMMARY OF THE INVENTION

Therefore, it is a primary objective of the present invention to provide a color temperature controller and a color temperature control method of light emitting diode, and the color temperature controller comprises a plurality of touch switches (such as capacitance touch switches), each having a color pattern, such that when a user clicks and selects a color from the color pattern, a control element of the color temperature controller receives signals of colors outputted respectively from the touch switches, and outputs a corresponding PWM signal according to the signals of the colors to control either the current or the voltage of a three-color (including red (R), green (G) and blue (B)) LED in an LED lamp, such that the LED lamp produces a same color temperature change of the signals of the colors.

Another objective of the present invention is to provide a color temperature controller and a color temperature control method of a light emitting diode, such that if the control element of the color temperature controller intends to select a plurality of three-color light emitting diodes (LEDs), a select key installed on the color temperature controller and provided for receiving a select signal of the select key selects the three-color LEDs, and performs a color temperature control of the three-color LEDs, and a plurality of display elements disposed on the color temperature controller correspond to the quantity of the three-color LEDs selected by the select key. If the control element resets the three-color LEDs, a reset key disposed on the color temperature controller will reset either a current or a voltage of the three-color LEDs, such that either the current or the voltage reaches a predetermined level.

DETAILED DESCRIPTION OF THE PREFERRED EMBODIMENTS

To make it easier for our examiner to understand the technical measures and operating procedure of the invention, we use preferred embodiments together with the attached drawings for the detailed description of the invention.

Figure 1:
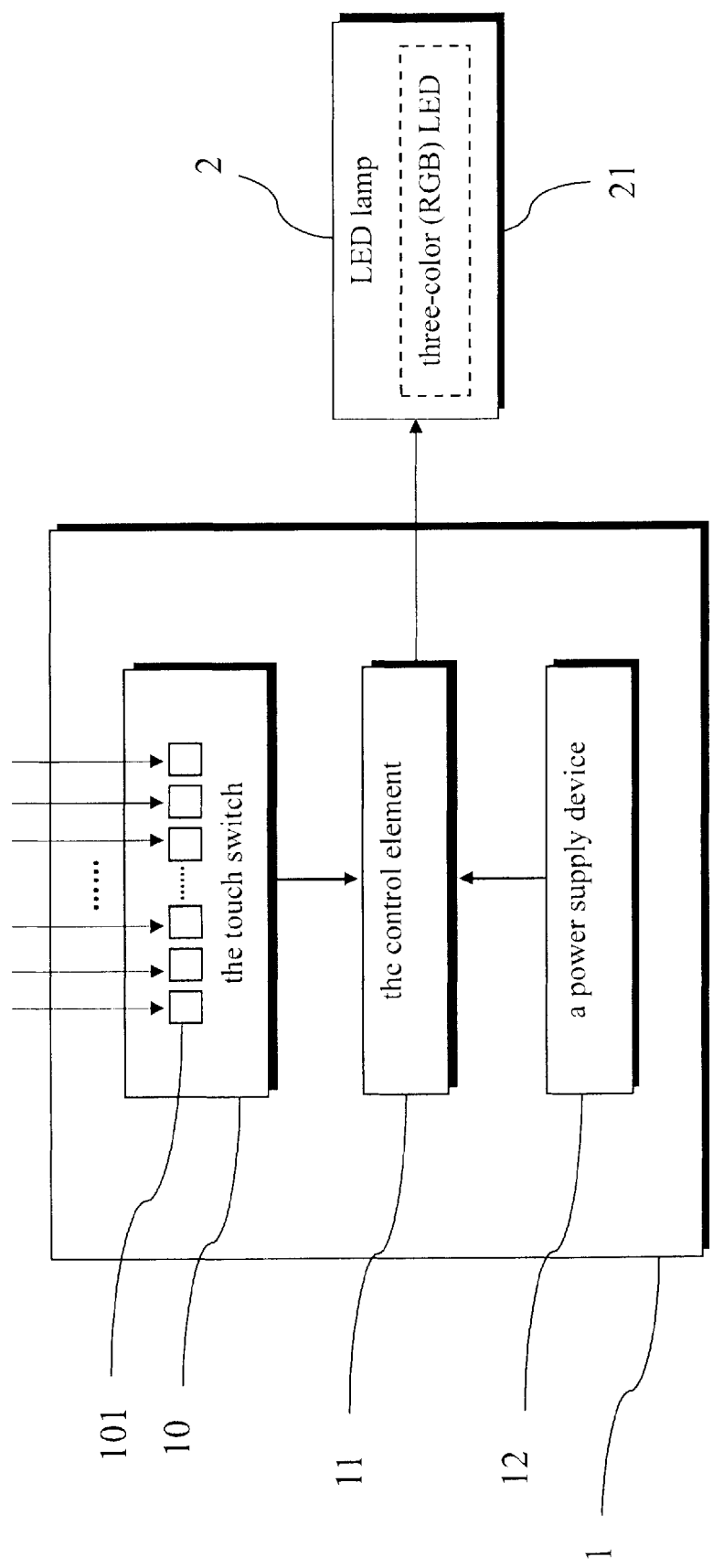
FIG. 1 is a block diagram of a color temperature controller in accordance with a preferred embodiment of the present invention.

The present invention discloses a color temperature controller and a color temperature control method of a light emitting diode. With reference to FIG. 1 for a block diagram of a color temperature controller 1 of an LED lamp 2 in accordance with a preferred embodiment of the invention, the color temperature controller 1 comprises a plurality of touch switches 10 (which are a plurality of capacitance touch switches in this embodiment), a control element 11 and a power supply device 12, wherein the touch switch 10 includes a color pattern 101 provided for a user to click and select any one color on the color patterns 101, such that the signals of the colors can be outputted through the touch switch 10.

The control element 11 is provided for receiving signals of colors outputted from the touch switches 10, and outputting a corresponding pulse width modulation (PWM) signal according to the signals of the colors to control either a current or a voltage of a three-color (including red (R), green (G) and blue (B)) LED 21 in the LED lamp 2, such that the LED lamp 2 produces a same color temperature change of the signals of the colors.

The power supply device 12 is provided for supplying electric power for related electronic components of the color temperature controller 1.

In the present invention, the color patterns 101 are distributed according to the 1931 XYZ color space established by the Commission Internationale de l'Eclairage (CIE).

Figure 2:
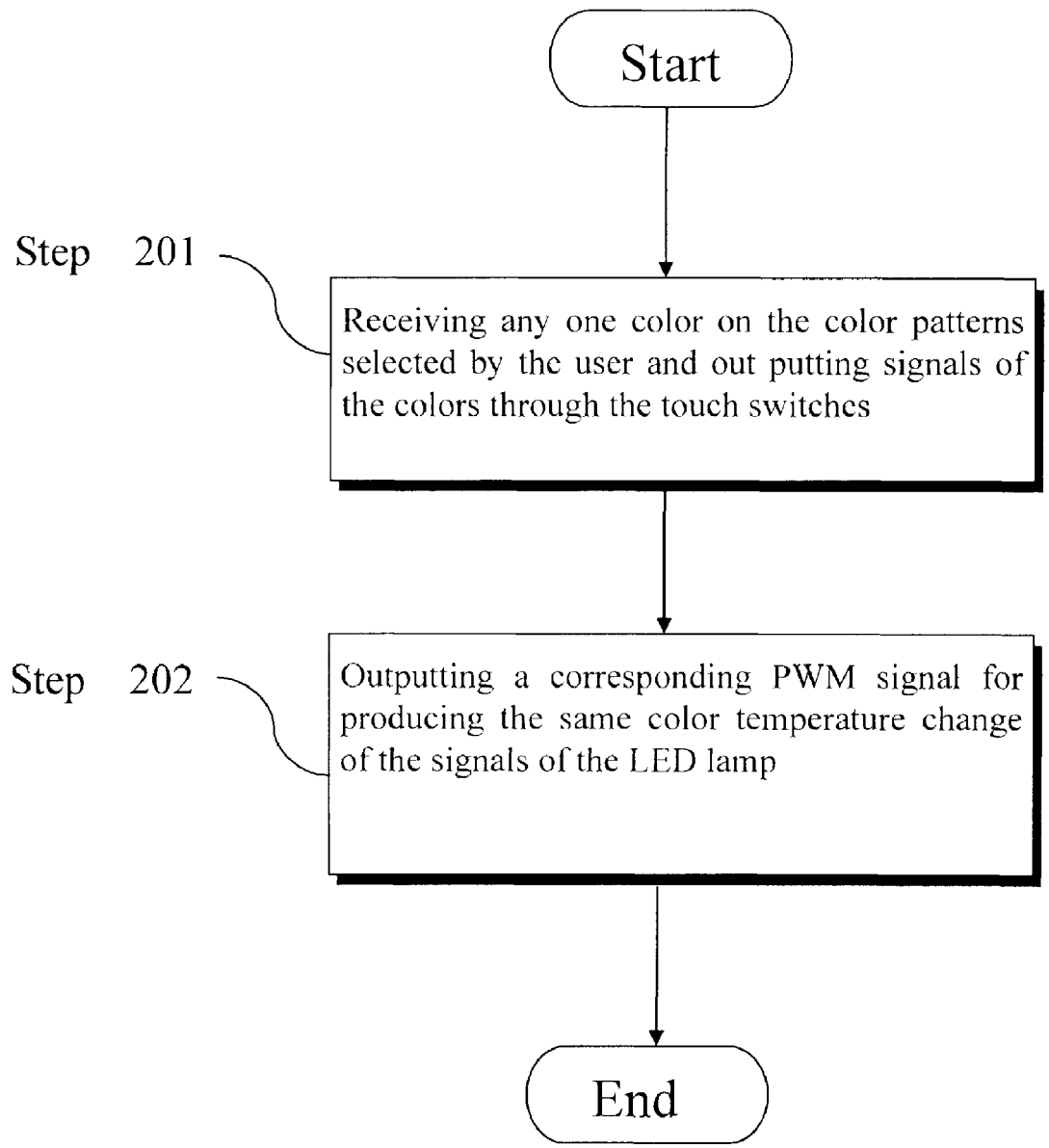
FIG. 2 is a flow chart of a color temperature control as depicted in FIG. 1.

With reference to FIGS. 1 and 2 for a flow chart of a control element 11 installed on a color temperature controller 1 applied in the LED lamp 2 producing a color temperature change, the flow chart comprises the following steps:

Step 201: Any one color on the color patterns 101 selected by the user is received, and signals of the colors through the touch switches 10 are outputted.

Step 202: A corresponding PWM signal is outputted according to the signals of the colors to control either a current or a voltage of the three-color LED 21 in the LED lamp 2, such that the LED lamp 2 produces a same color temperature change of the signals of the colors to complete the procedure of a color temperature change of the LED lamp 2.

Figure 3:
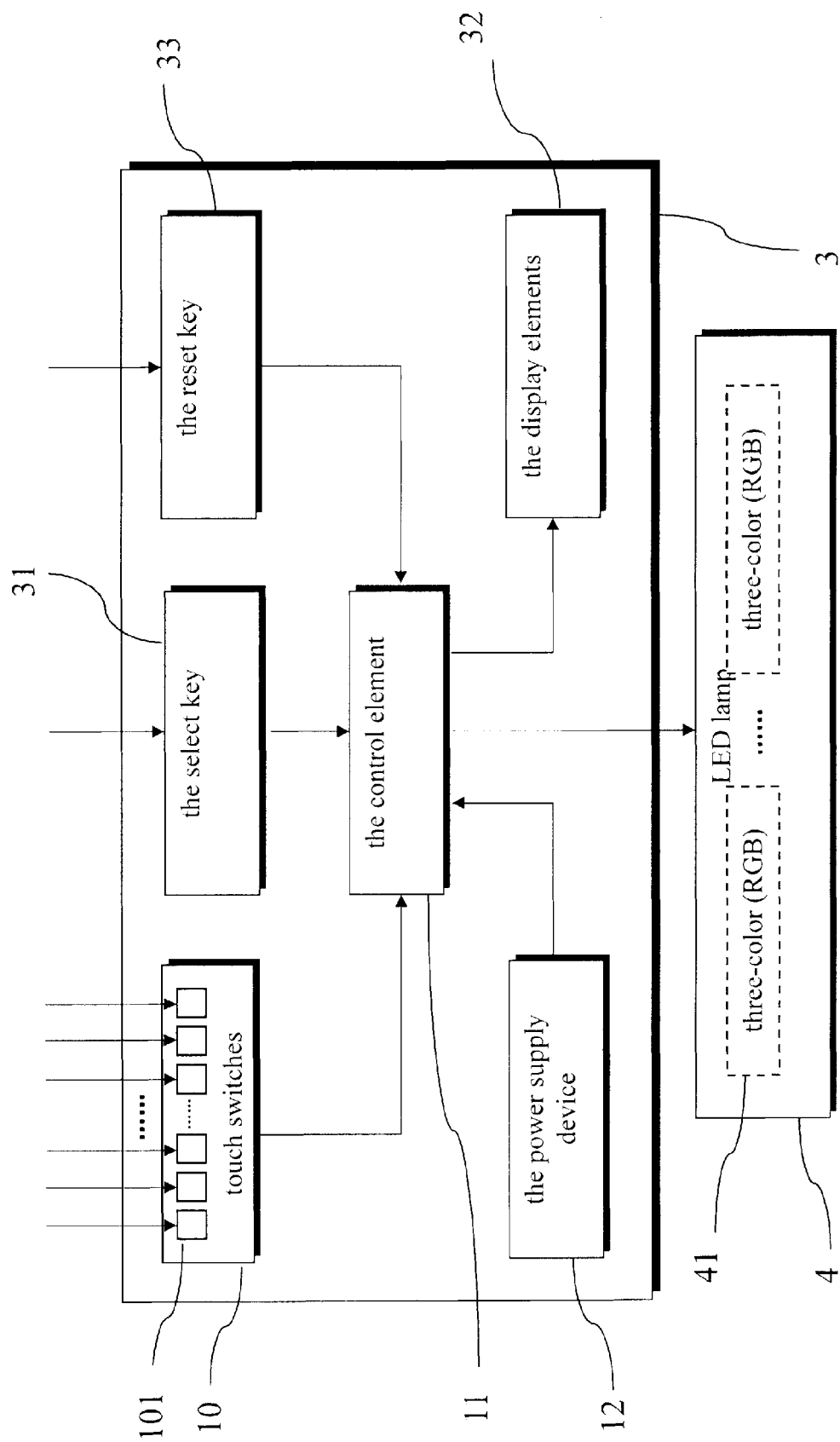
FIG. 3 is a block diagram of a color temperature controller in accordance with another preferred embodiment of the present invention.

With reference to FIG. 3 for a block diagram of a color temperature controller 3 applied in an LED lamp 4 in accordance with another preferred embodiment of the present invention, the color temperature controller 3 comprises the plurality of touch switches 10, the control element 11 and the power supply device 12 as shown in FIG. 1, and further comprises a select key 31, a plurality of display elements 32 and a reset key 33, wherein the select key 31 is used for outputting a select instruction, such that the control element 11 selects a plurality of three-color LEDs 41 from another LED lamp 4 and performs a color temperature control of the three-color LEDs 41.

The display elements 32 are used for receiving a display instruction issued by the control element 11 and a quantity of three-color LEDs 41 selected by the select key 31.

The reset key 33 is used for outputting a reset instruction, such that the control element 11 resets either a current or a voltage of the three-color LEDs 41, and the current or the voltage reaches a predetermined level.

In this invention, if the select key 31 is applied to a plurality of three-color LEDs 41 of another LED lamp 4, a sequential select key is provided for selecting a quantity of three-color LEDs 41 sequentially. If the quantity of the three-color LEDs 41 is equal to three, the select key 31 can be designed in a model as follows:

For a first-time touch, a first three-color LED 41 is selected.

For a second-time touch, a second three-color LED 41 is selected.

For a third-time touch, a third three-color LED 41 is selected.

For a fourth-time touch, a first and a second three-color LEDs 41 are selected.

For a fifth-time touch, a first and a third three-color LEDs 41 are selected.

For a sixth-time touch, a second and a third three-color LEDs 41 are selected.

For a seventh-time touch, a first, a second and a third three-color LEDs 41 are selected.

For an eighth touch, the control element 11 does not select any three-color LED 41.

In this invention, the display elements 32 are a plurality of light emitting diodes (LEDs).

Figure 4:
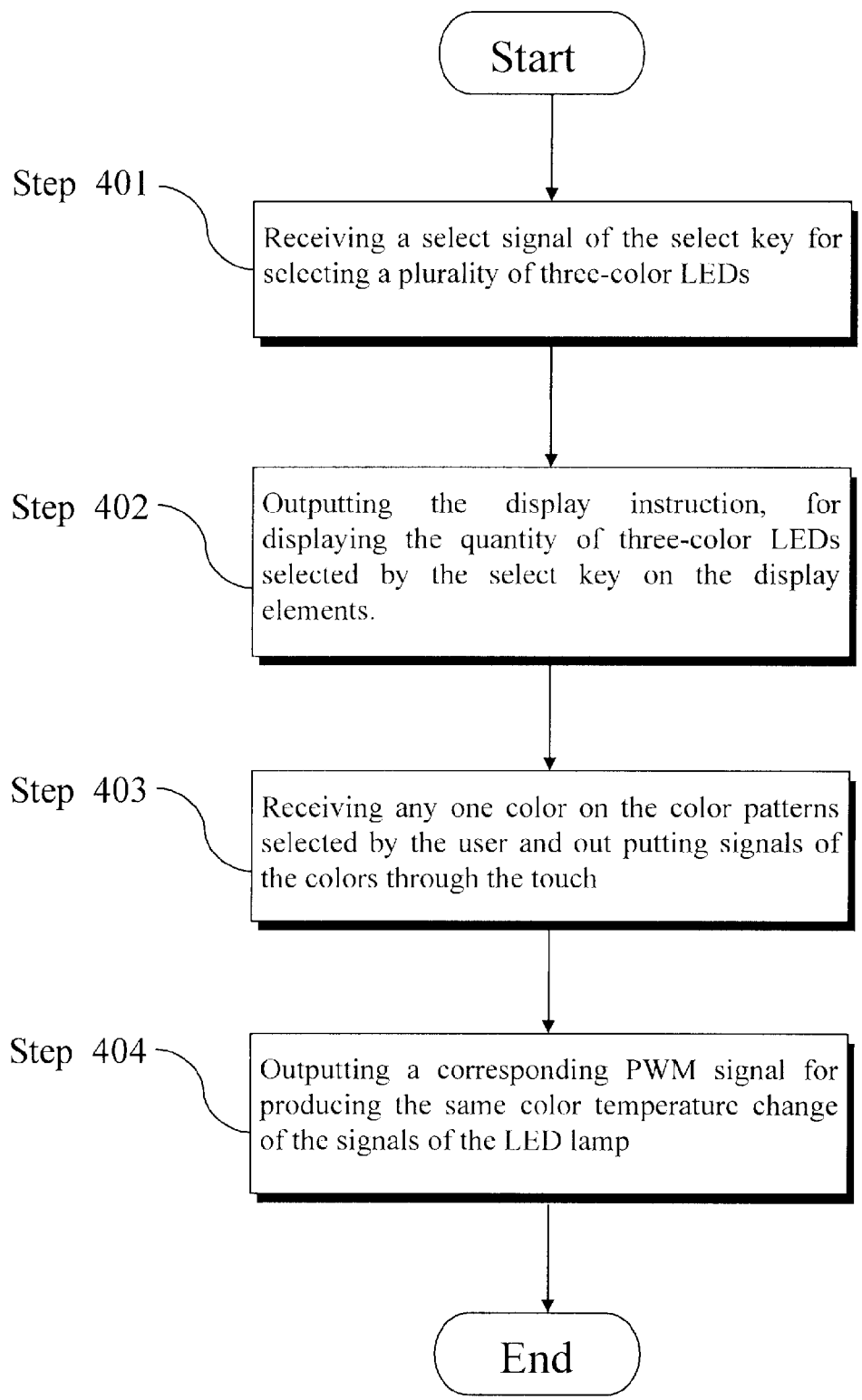
FIG. 4 is a flow chart of a color temperature control as depicted in FIG. 3.

With reference to FIGS. 3 and 4, a color temperature controller 3 is applied in an LED lamp 4 in accordance with another preferred embodiment of the present invention, the control element 11 of the other color temperature controller 3 selects a plurality of three-color LEDs 41 of the LED lamp 4 through the select key 31, and the display element 32 displays the quantity of three-color LEDs 41 and produces a color temperature change to the LED lamp 4 in a procedure as follows:

Step 401: A select signal of the select key 31 is received for selecting a plurality of three-color LEDs 41 of the other LED lamp 4 and a color temperature control of the three-color LEDs 41 is performed.

Step 402: The display instruction is outputted, such that the display elements 32 displays the quantity of three-color LEDs 41 selected by the select key 31.

Step 403: Any one color on the color patterns 101 is selected by the user, and signals of the colors are outputted through the touch switches 10.

Step 404: Either a current or a voltage of the three-color LEDs 41 in the LED lamp 4 is controlled to output a corresponding PWM signal according to the signals of the colors, such that the LED lamp 4 produces the same color temperature change of the signals of the colors to complete displaying the quantity of the three-color LEDs 41 and producing a color temperature change of the LED lamp 4.

Figure 5:
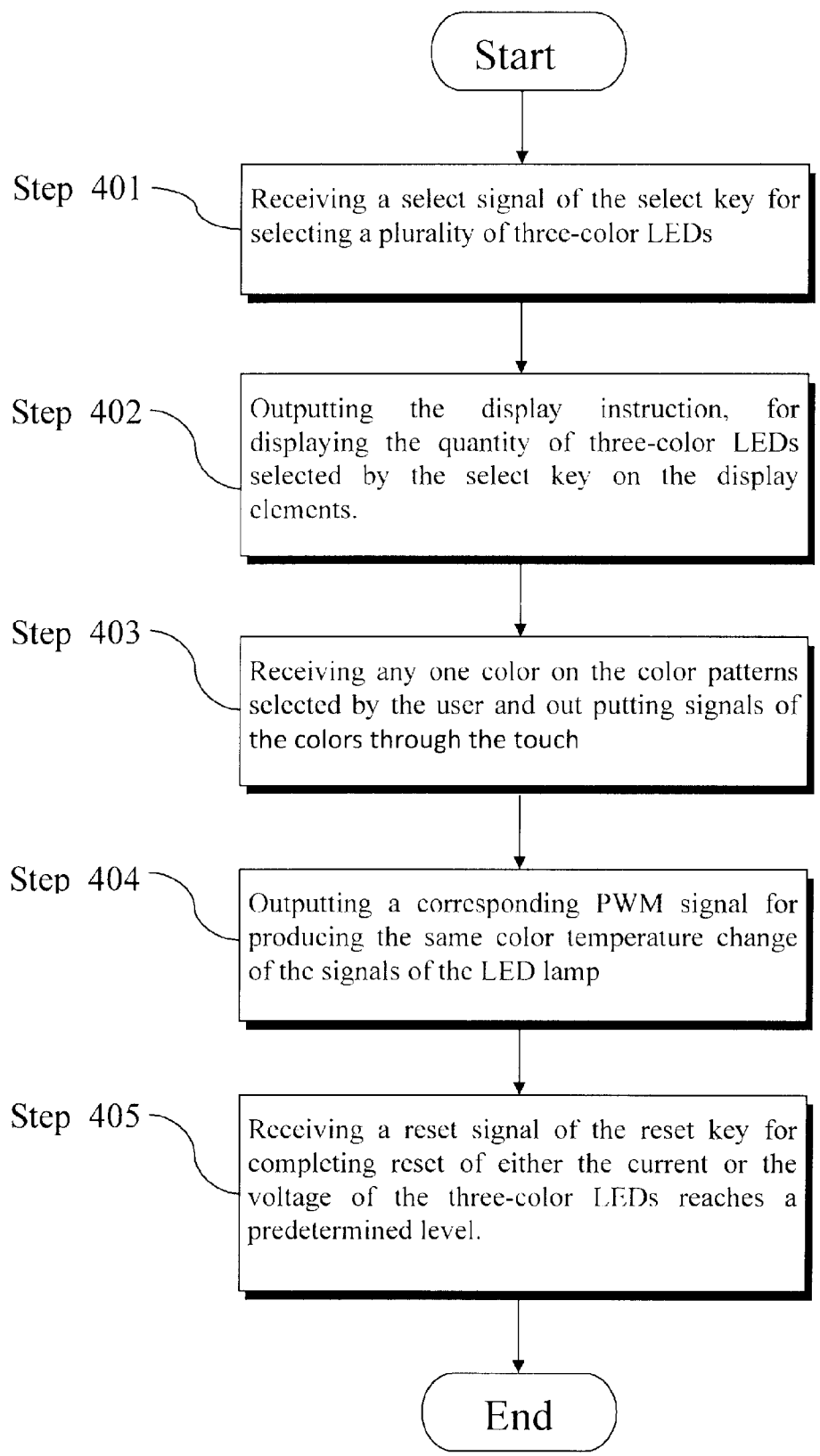
FIG. 5 is another flow chart of a color temperature control as depicted in FIG. 3.

In FIGS. 4 and 5, after the Step 404 in this invention, the control element 11 further carries out a procedure of rebooting either the current or the voltage of the three-color LEDs 41 as follows:

Step 405: A reset signal of the reset key 33 is received to reset either the current or the voltage of the three-color LEDs 41, such that the current or the voltage reaches a predetermined level to complete resetting either the current or the voltage of the three-color LEDs.

In summation of the description above, the difference between the invention and the prior art resides on that: the color temperature controller 1 and the other color temperature controller 3 are applied in the LED lamp 2 and the other LED lamp 4 respectively, the control element 11 can be used for performing the color temperature control of the LED lamp 2 and the other LED lamp 4 effectively to improve the deficiency of the color temperature control of the conventional LED lamps, such that the LED lamp 2 and the other LED lamp 4 may have a flexible color change, and the select key 31 can be used for selecting a plurality of three-color LEDs 41 of the other LED lamp 4, such that the control element 11 performs a color temperature control of the three-color LEDs 41, and the display elements 32 displays the quantity of the three-color LEDs 41.

Obviously, the color temperature controller 1 and the other color temperature controller 3 of the invention comply with the patent application requirements, and the present invention is also valuable in related industries (such as illumination, optoelectronic and tour industries, etc).

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A color temperature controller of a light emitting diode (LED), applied in a light emitting diode (LED) lamp, and the color temperature controller comprising:

a plurality of touch switches, each having a color pattern, provided for a user to select any one color from the color patterns, such that signals of the colors are outputted through the touch switches;

a control element, for receiving the signals of the colors outputted by the touch switches, and outputting a corresponding PWM signal according to the signals of the colors to control either a current or a voltage of a three-color LED in the LED lamp, such that the LED lamp produces a same color temperature change of the signals of the colors; and a power supply device, for supplying an electric power required by related electronic components of the color temperature controller.

2. The color temperature controller of a light emitting diode as recited in claim 1, further comprising:

a select key, for outputting a select instruction, such that the control element selects a plurality of three-color LEDs of another LED lamp, and performs a color temperature control of the three-color LEDs;

a plurality of display elements, for receiving a display instruction transmitted from the control element, and displaying the three-color LEDs selected by the select key according to the display instruction; and a reset key, for outputting a reset instruction, such that the control element resets either a current or a voltage of the three-color LEDs and either the current or the voltage reaches a predetermined level.

3. The color temperature controller of a light emitting diode as recited in claim 2, wherein the touch switches are a plurality of capacitance touch switches.

4. The color temperature controller of a light emitting diode as recited in claim 2, wherein the color pattern is distributed according to a color space established by the Commission Internationale de l'Eclairage (CIE).

5. The color temperature controller of a light emitting diode as recited in claim 2, wherein the select key is a sequential select key for selecting the three-color LEDs sequentially.

6. The color temperature controller of a light emitting diode as recited in claim 2, wherein the display elements are a plurality of light emitting diodes (LEDs).

7. A color temperature control method of a light emitting diode (LED), having a color temperature controller applied in an LED lamp, and the color temperature controller comprising a plurality of touch switches and a control element, and if the control element intends to produce a color temperature change to the LED lamp, the control element will carry out a procedure comprising the steps of:

receiving any one color on a color pattern of the touch switch selected by a user, and outputting a signal of the color through the touch switch;

outputting a corresponding power width modulation (PWM) signal according to the signal of the color to control either a current or a voltage of a three-color LED in the LED lamp, such that the LED lamp produces a same color temperature change of the signal of the color.

8. The color temperature control method of a light emitting diode (LED) as recited in claim 7, wherein if the control element intends to select a plurality of three-color LEDs for receiving any one color on a color pattern of the touch switch selected by the user, a select signal of a select key disposed on the color temperature controller is received to select the three-color LEDs and perform a color temperature control of the three-color LEDs before the touch switches output the signals of the colors.

9. The color temperature control method of a light emitting diode (LED) as recited in claim 8, wherein if the control element intends to select displaying a quantity of the three-color LEDs, a display instruction will be outputted, such that a plurality of display elements of the color temperature controller display the quantity of the three-color LEDs selected by the select key.

10. The color temperature control method of a light emitting diode (LED) as recited in claim 8, wherein when the control element intends to reset the three-color LEDs, a reset key disposed on the color temperature controller is used for resetting either a current or a voltage of the three-color LEDs, such that either the current or the voltage reaches a predetermined level.

* * * * *